United States Patent
Joshi et al.

(10) Patent No.: US 9,418,148 B2
(45) Date of Patent: Aug. 16, 2016

(54) SYSTEM AND METHOD TO LABEL UNLABELED DATA

(71) Applicant: Nuance Communications, Inc., Burlington, MA (US)

(72) Inventors: Sachindra Joshi, New Dehli (IN); Shantanu Ravindra Godbole, New Dehli (IN); Ashish Verma, New Dehli (IN)

(73) Assignee: Nuance Communications, Inc., Burlington, MA (US)

( * ) Notice: Subject to any disclaimer, the term of this patent is extended or adjusted under 35 U.S.C. 154(b) by 129 days.

(21) Appl. No.: 13/731,651

(22) Filed: Dec. 31, 2012

(65) Prior Publication Data

US 2014/0188881 A1    Jul. 3, 2014

(51) Int. Cl.
*G06F 17/30*    (2006.01)

(52) U.S. Cl.
CPC ................................. *G06F 17/3071* (2013.01)

(58) Field of Classification Search
CPC ................. G06F 17/30598; G06F 17/30705; G06F 17/30648; G06F 17/3041
USPC ............ 707/737, E17.089, E17.046, 748, 73; 706/12
See application file for complete search history.

(56) References Cited

U.S. PATENT DOCUMENTS

| | | | |
|---|---|---|---|
| 6,460,035 B1 | 10/2002 | Siegwart | |
| 6,654,739 B1 | 11/2003 | Apte et al. | |
| 7,779,349 B2 | 8/2010 | Spangler | |
| 2005/0234955 A1* | 10/2005 | Zeng et al. | 707/101 |
| 2008/0249999 A1* | 10/2008 | Renders et al. | 707/4 |
| 2010/0161609 A1* | 6/2010 | Fogel | 707/737 |
| 2012/0072421 A1* | 3/2012 | Bhattacharya et al. | 707/737 |
| 2012/0143795 A1* | 6/2012 | Han et al. | 706/12 |
| 2012/0233167 A1* | 9/2012 | Gates et al. | 707/737 |

* cited by examiner

*Primary Examiner* — Robert Beausoliel, Jr.
*Assistant Examiner* — Pedro J Santos
(74) *Attorney, Agent, or Firm* — Hamilton, Brook, Smith & Reynolds, P.C.

(57) ABSTRACT

An embodiment of the invention provides a technique for permitting a machine to discover classes and topics that data contains and to annotate data objects with those identified classes. The technique enables machines to group and annotate data objects in ways that are meaningful and intuitive for a user of the data objects. An interactive method uses clustering, along with feedback from a user on the clustering output, to discover a set of classes. The feedback from the user is used to guide the clustering process in the later stages, which results in better and better discovery of classes and annotations with more and more human feedback. A method can be used to produce labeled data that involves discovering classes and annotating a given dataset with the discovered class labels. This is advantageous for building a classifier that has wide applications, such as call routing and intent discovery.

17 Claims, 11 Drawing Sheets

Cluster 1 (0.617)

Context: change wanna changing sir calling telephone problem phone dollars cell speaking phones line fee call + 65 Calls Call Summary 427  FILE: 74E94C5D-C5CE11DF-8D56C5CA-9302F8FB.txt    ☐ Accept  ☐ Reject
wanna(53.4) carlos(40.0) change(38.7) repeat(35.0) line(28.7) transfer(24.6)
TRANSCRIPTION: [4.0] it's another great day here at Metro P C S my name is Carlos I D how may I help you [5.0] [u] yeah I want to change the phone [6.0] changing how much a different phone [7.0] I'm sorry sir can you repeat it again yeah [8.0] hello [9.0] [u] I wanna change the the phone like the cell phone [10.0] okay you wanna change your phone you mean you wanna transfer your line over a new phone right [11.0] yeah [12.0] yeah 543  FILE: 93221B44-C44911DF-87B5949F-7B4DBCC0.txt    ☐ Accept  ☐ Reject
change(77.2) area(43.9) code(32.5) account(29.9) phone(10.9) number(3.6)
TRANSCRIPTION: [1.0] it's another great day at Metro P C S this is Francisco I d number how can I help you [2.0] yes I'm trying to change my phone number [3.0] change your phone number yes ma'am my pleasure with that may i please have your phone number [4.0] [u] [5.0] thank you [u] what is your area code please [6.0] [7.0] thank you [8.0] may i please have your name and the name in account [9.0] Sabrina spress 703  FILE: CB233BDF-CE6811DF-8DF8949F-7B4DBCC0.txt    ☐ Accept  ☐ Reject
change(57.1) starting(54.5) wanna(39.4) area(32.5) code(24.1) account(22.1)
TRANSCRIPTION: [4.0] it's another great day at metro p c s number to on my account to another phone [9.0] alright that will be [u] fine with that so we can help you change your phone okay [10.0] can i get your [u] p c s number starting with area code first [11.0]

FIG. 5

Cluster 2(0.488)
Context: voicemail password reset temporary voice code set default don issues account josh time access work
+ 29 Calls ⎧ 666
Call Summary 141    FILE: 3295A3FE-BD2A11DF-887C84FA-1F2C8FB6.txt    (0.742)  ☑ Accept ☐ Reject
reset(63.3) password(57.3) voicemail(47.8) account(19.9) phone(2.4) metro(1.8)
TRANSCRIPTION: [3.0] it's another great day here at metro p c s this is alyssa i d number how may i help you today [4.0] yes [u] i forgot my voicemail password and i need to reset it [5.0] yes ma'am i'll be more than happy to do that for may i have your phone number please [6.0] [7.0] [8.0] [9.0] thank you ma'am [10.0] and may i have the name of that account please [11.0] natia [q]

⎧ 667
464    FILE: 7F9170D8-BF8311DF-9492949F-7B4DBCC0.txt    (0.721)  ☑ Accept ☐ Reject
password(59.1) voicemail(49.2) josh(42.9) reset(32.6) off(24.3) phones(23.7)
TRANSCRIPTION: [4.0] [n] it's another great day at metro p c s my name is josh my i d number's how may i assist you [5.0] yes I need to [u] reset my voicemail password for one of my phones [6.0] sure ma'am i will be more than happy to assist you in resetting the voicemail password may i please have that phone number please [7.0] does does that phone that need to be off [8.0] no [9.0] oh okay so cause [u] okay it's [u]

382    FILE: 6B862D1-BF7E11DF-8BA1949F-7B4DBCC0.txt    (0.719)    ☐ Accept ☐ Reject
temporary(44.7) voicemail(42.6) password(40.9) guess(27.4) passcode(22.6) reset(22.6)
TRANSCRIPTION: [2.0] it's another great day here at Metro P C S my name is rodell I D number how may I help you today [3.0] [u] yes I was calling because I was trying to figure out what would be the temporary passcode it's not letting me to [4.0] sorry ma'am [5.0] it's not allowing me to start my voicemail it's-i'm not [u] i guess i'm not putting in the correct temporary passcode i'm not-i don't know what it is [6.0] okay [7.0] okay I'm sorry to hear that you forgot your [u] voicemail password but I'll be more than willing to [u] reset your voicemail password right now okay and may i please have your

FIG. 6

Cluster 2(0.488)
Context: voicemail password reset temporary voice code set default don issues account josh time access work
+ 29 Calls 141   FILE: 3295A3FE-BD2A11DF-887C84FA-1F2C8FB6.txt   (0.742) ☑ Accept ☐ Reject
reset(63.3) password(57.3) voicemail(47.8) account(19.9) phone(2.4) metro(1.8)
TRANSCRIPTION: i help you today [4.0] yes [u] i forgot my voicemail
password and i need phone number please [6.0] [7.0] [8.0] [9.0] thank
you ma'am [10.0] an 464   FILE: 7F917... voic
password(59.1) voic
TRANSCRIPTION Explorer User Prompt                                    ☒
Script Prompt:
Please Enter the Cluster Name
                                              OK
Voicemail                                   Cancel r's how may i assist you [5.0] yes I need to [u] reset
my voicemail password for one of my phones [6.0] sure ma'am i will be more than happy to assist you in resetting the voicemail password may i please
have that phone number please [7.0] does does that phone that need to be off [8.0] no [9.0] oh okay so cause [u] okay it's [u]

382   FILE: 6B862D1-BF7E11DF-8BA1949F-7B4DBCC0.txt   (0.719) ☐ Accept ☐ Reject
temporary(44.7) voicemail(42.6) password(40.9) guess(27.4) passcode(22.6) reset(22.6)
TRANSCRIPTION: [2.0] it's another great day here at Metro PCS my name is rodell I D number how may I help you today [3.0] [u] yes I was calling
because I was trying to figure out what would be the temporary passcode it's not letting me to [4.0] sorry ma'am [5.0] it's not allowing me to start my
voicemail it's-i'm not [u] i guess i'm not putting in the correct temporary passcode i'm not-i don't know what it is [6.0] okay [7.0] okay I'm sorry to hear
that you forgot your [u] voicemail password but I'll be more than willing to [u] reset your voicemail password right now okay and may i please have your

FIG. 7

Voicemail(0.488)
Context : voicemail password reset temporary voice code set default don issues account josh time access work
+ 29 Calls

MEMBERSHIP CONSTRAINTS
⎯⎯⎯866

141  FILE: 3295A3FE-BD2A11DF-887C84FA-1F2C8FB6.txt   (0.742)     ☑ Accept ☐ Reject
reset(63.3) password(57.3) voicemail(47.8) account(19.9) phone(2.4) metro(1.8)
TRANSCRIPTION: [3.0] it's another great day here at metro p c s this is alyssa i d number how may i help you today [4.0] yes [u] i forgot my voicemail password and i need to reset it [5.0] yes ma' am i'll be more than happy to do that for may i have your phone number please [6.0] [7.0] [8.0] [9.0] thank you ma'am [10.0] and may i have the name of that account please [11.0] natia [q]

MEMBERSHIP CONSTRAINTS
⎯⎯⎯867

464  FILE: 7F9170D8-BF8311DF-9492949F-7B4DBCC0.txt   (0.721)     ☑ Accept ☐ Reject
password(59.1) voicemail(49.2) josh(42.9) reset(32.6) off(24.3) phones(23.7)
TRANSCRIPTION: [4.0] [n] it's another great day here at metro p c s my name is josh my i d number's how may i assist you [5.0] yes I need to [u] reset my voicemail password for one of my phones [6.0] sure ma'am i will be more than happy to assist you in resetting the voicemail password may i please have that phone number please [7.0] does does that phone that need to be off [8.0] no [9.0] oh okay so cause [u] okay it's [u]

382  FILE: 6B862D1-BF7E11DF-8BA1949F-7B4DBCC0.txt   (0.719)     ☐ Accept ☐ Reject
temporary(44.7) voicemail(42.6) password(40.9) guess(27.4) passcode(22.6) reset(22.6)
TRANSCRIPTION: [2.0] it's another great day here at Metro P C S my name is rodell I D number how may I help you today [3.0] [u] yes I was I was calling because I was trying to figure out what would be the temporary passcode it's not letting me to [4.0] sorry ma am [5.0] it's not allowing me to start my voicemail it's-i'm not [u] i guess i'm not putting in the correct temporary passcode i'm not-i don't know what it is [6.0] okay [7.0] okay I'm sorry to hear that you forgot your [u] voicemail password but I'll be more than willing to [u] reset your voicemail password right now okay and may i please have your mobile number starting with your area code please [8.0] [u] it never was one it's - i just got the phone and i never set the voicemail up so it's telling me i

SYSTEM AND METHOD TO LABEL UNLABELED DATA

BACKGROUND OF THE INVENTION

In a variety of different contexts, it is frequently necessary to discover classes and topics that data contains and to annotate data objects with those identified classes. For example, such annotation is useful for customer feedback forms, call center problem tickets and agent-customer conversational transcripts.

In the field of machine learning, there exist supervised and unsupervised techniques. However, supervised techniques require trained data and assume that the trained data is accurate; and, with unsupervised techniques, it is difficult to determine how to interpret clusters that are generated by such techniques.

SUMMARY OF THE INVENTION

In accordance with an embodiment of the invention, there is provided a device for labeling unlabeled data. The device comprises a clustering processor configured to group the unlabeled data to produce at least one data group; a feedback processor configured to enable a user to provide feedback on the at least one data group, the feedback including at least one of the following: (i) feedback on membership of a data object in a data group, and (ii) feedback on a current labeling of a data group; the clustering processor further configured to regroup the at least one data group using at least one constraint based on the feedback provided by the user; and the feedback processor further configured to apply a label to a data group of the at least one data group to produce at least one labeled data group, the label based on the feedback provided by the user after the grouping or on feedback provided by the user after at least one regrouping by the clustering processor.

In further, related embodiments, the feedback processor may be further configured to discover a set of data objects on which to seek feedback from the user; and the feedback processor may be still further configured to enable the user to provide feedback based on the discovered set of data objects. The clustering processor may comprise a K-means clustering processor, where the term K-means clustering is defined as partitioning n observations into k clusters in which each observation belongs to the cluster with the nearest mean. The feedback processor may be further configured to receive feedback provided by the user including at least one of the following: a new name of a data group; an acceptance of membership of a data object in a data group; a rejection of membership of a data object in a data group; a splitting of a data group; a merging of a data group; an acceptance of a member of a cluster centroid of a data group; and a rejection of a member of a cluster centroid of a data group. The feedback processor may be further configured to display at least one data object of the at least one labeled data group to the user. The clustering processor may be further configured to determine, for a data group of the at least one data group: (i) at least one data object belonging to the data group; and (ii) a context vector for the data group. The clustering processor may be further configured to determine, for a data group of the at least one data group, a scoring measure for the data group. The clustering processor may be further configured to group the data based on at least one initial constraint provided by the user.

In another embodiment according to the invention, there is provided a method for labeling unlabeled data. The method comprises grouping the unlabeled data using clustering to produce at least one data group; enabling a user to provide feedback on the at least one data group, the feedback including at least one of the following: (i) feedback on membership of a data object in a data group, and (ii) feedback on a current labeling of a data group; regrouping the at least one data group using further clustering including at least one constraint based on the feedback provided by the user; and applying a label to a data group to produce at least one labeled data group, the label based on the feedback provided by the user after the grouping or on feedback provided by the user after at least one regrouping.

In further, related embodiments, the method may further comprise discovering a set of data objects on which to seek feedback from the user. The enabling the user to provide feedback may be performed based on the discovered set of data objects. The grouping the data using clustering may comprise performing K-means clustering on the data. The feedback provided by the user may comprise at least one of the following: a new name of a data group; an acceptance of membership of a data object in a data group; a rejection of membership of a data object in a data group; a splitting of a data group; a merging of a data group; an acceptance of a member of a cluster centroid of a data group; and a rejection of a member of a cluster centroid of a data group. The method may further comprise displaying at least one data object of the at least one labeled data group to the user. Grouping the data may comprise, for a data group of the at least one data group, determining: (i) at least one data object belonging to the data group; and (ii) a context vector for the data group. Grouping the data may comprise, for a data group of the at least one data group, determining a scoring measure for the data group. The grouping the data using clustering may be performed based on at least one initial constraint provided by the user.

In another embodiment according to the invention, there is provided a non-transient computer-readable storage medium having computer-readable code stored thereon, which, when executed by a computer processor, causes the computer processor to label unlabeled data, by causing the processor to: group the unlabeled data using clustering to produce at least one data group; enable a user to provide feedback on the at least one data group, the feedback including at least one of the following: (i) feedback on membership of a data object in a data group, and (ii) feedback on a current labeling of a data group; regroup the at least one data group using further clustering including at least one constraint based on the feedback provided by the user; and apply a label to a data group to produce at least one labeled data group, the label based on the feedback provided by the user after the grouping or on feedback provided by the user after at least one regrouping.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4 through 9 are example interfaces for performing clustering in an interactive manner for discovering intents, in accordance with an embodiment of the invention.

DETAILED DESCRIPTION OF THE INVENTION

A description of example embodiments of the invention follows.

In accordance with an embodiment of the invention, there is provided a technique for permitting a machine to discover classes and topics that data contains and to annotate data objects with those identified classes. The technique enables machines to group and annotate data objects in ways that are meaningful and intuitive for a user of the data objects.

An embodiment according to the invention provides an interactive method that uses clustering, along with feedback from a user on the clustering output, to discover a set of classes. The feedback from the user is used to guide the clustering process in the later stages, which results in better and better discovery of classes and annotation with more and more human feedback.

A method in accordance with an embodiment of the invention can be used to produce labeled data that involves discovering classes and annotating a given dataset with the discovered class labels. This is advantageous for building a classifier that has wide applications, such as call routing and intent discovery.

Figure 1:
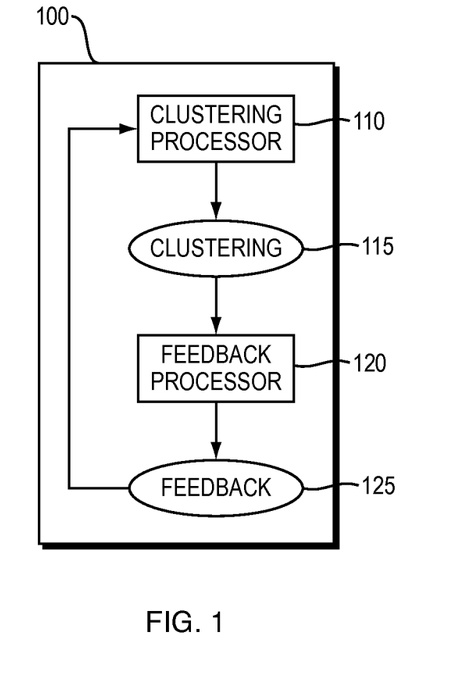
FIG. 1 is a block diagram of a device for labeling unlabeled data in accordance with an embodiment of the invention.

FIG. 1 is a block diagram of a device for labeling unlabeled data in accordance with an embodiment of the invention. The device 100 includes a clustering processor 110 and a feedback processor 120. Given a set of data points, the clustering processor 110 uses a clustering method to determine a grouping in the dataset. The clustering processor 110 outputs the clustering 115, where each cluster is, for example, described based on the dominant features that appear in the cluster. The clustering output 115 is provided to the feedback processor 120, which enables the user to see the objects that belong to each of the clusters and to provide feedback 125 on the clustering output. The feedback 125 from the user is then provided back to the clustering processor 110 in order to re-determine the clustering based on the new constraints provided by the user.

Figure 2:
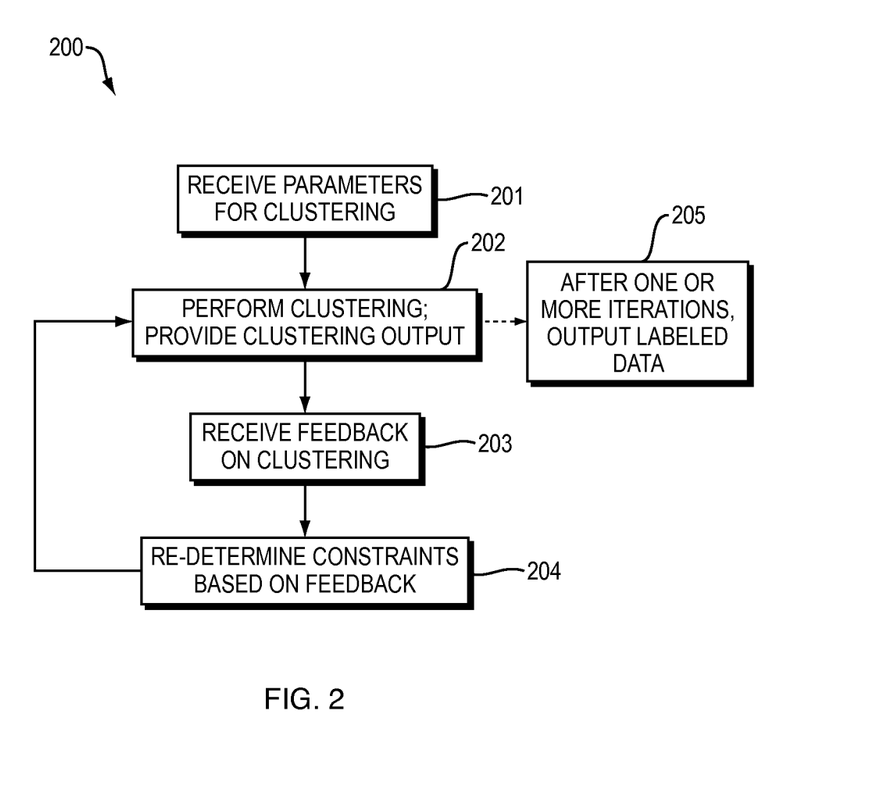
FIG. 2 is a block diagram of an example of an interaction model in which a user is enabled to provide feedback to a machine learning system, in accordance with an embodiment of the invention.

FIG. 2 is a block diagram 200 of an example of an interaction model in which a user is enabled to provide feedback to a machine learning system (such as a system that includes the device of FIG. 1), in accordance with an embodiment of the invention. In the block diagram 200, the system receives from a user a specified set of parameters for the clustering (201), which may be used as a set of constraints for an initial clustering. For example, the set of parameters may include a path of a data file, a number of clusters, use phrases or other parameters. The system performs the clustering and provides clustering output for each cluster (202); for example, the clustering output may be: a) the number of calls (or other data objects) in each cluster, a goodness measure for the cluster, and a context vector for the cluster; and b) all of the calls (or other data objects) belonging to the cluster sorted by belongingness. The system thereafter receives, from the user, feedback on the clustering (203). For example, the feedback may include enabling the user to name clusters, accept/reject members of a cluster, split/merge a cluster, and/or accept/reject words appearing in the context of a centroid of a cluster. The system then re-determines the constraints based on the feedback (204), and returns to re-perform the clustering based on the further constraints based on the feedback (202). Ultimately, after one or more iterations of this process, the system outputs a set of labeled data (205), which may include labels for one or more of the clusters, some or all of the data belonging to the cluster, and summary data for the clusters. For example, in addition to one or more labels for the clusters, the labeled data may include a) the number of calls (or other data objects) in each cluster, a goodness measure for the cluster, a best (or most-representative) member of the cluster, and a context vector for the cluster; and b) all of the calls (or other data objects) belonging to the cluster sorted by belongingness.

In another embodiment, the system can also prompt a user with some calls (or other data objects) that are the "best" calls for getting the feedback (203). One example of "best" calls is "representative calls" that have many other calls similar to them and therefore feedback on representative calls can easily and correctly be generalized to many other calls.

Figure 3:
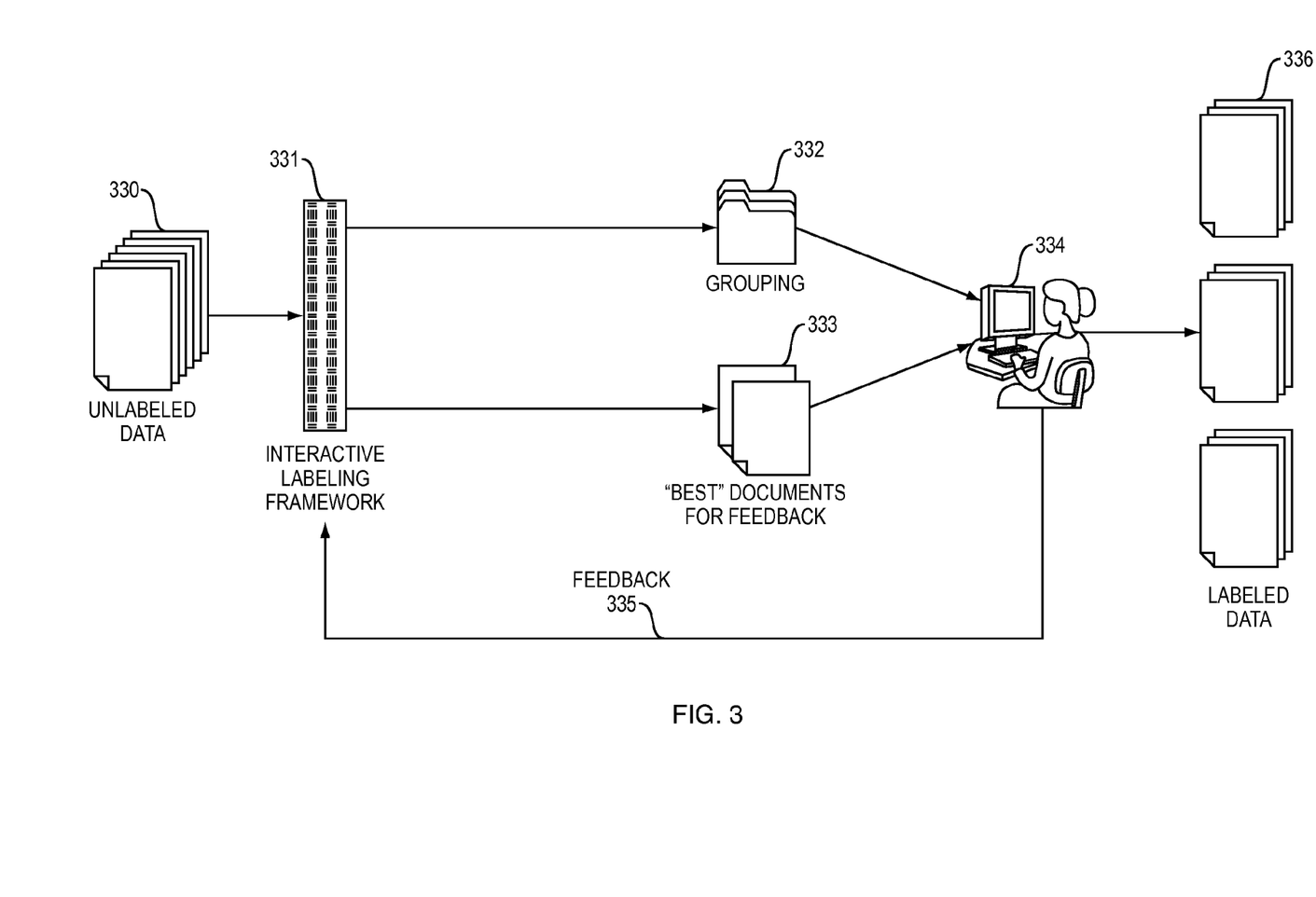
FIG. 3 is a diagram of components of an interactive framework for labeling the unlabeled data, in accordance with an embodiment of the invention.

FIG. 3 provides an overview of the framework that uses interaction as described above for labeling the unlabeled data. Unlabeled data 330 is input to the interactive labeling framework 331. The system performs grouping 332, and may determine a set of "best" documents for feedback 333. The grouping 332, and, if determined, the "best" documents 333, are provided to the user 334. The user provides feedback 335, based on which the system re-determines constraints for performing grouping 332 in a further iteration. Ultimately, after one or more iterations, the system outputs labeled data 336, which includes one or more labeled clusters that have been produced based on the iterative process of: (i) machine clustering, followed by (ii) machine iteration of the clustering based on the user's input.

FIGS. 4 through 9 provide an example interface for performing clustering in an interactive manner for discovering intents, in accordance with an embodiment of the invention.

Figure 4:
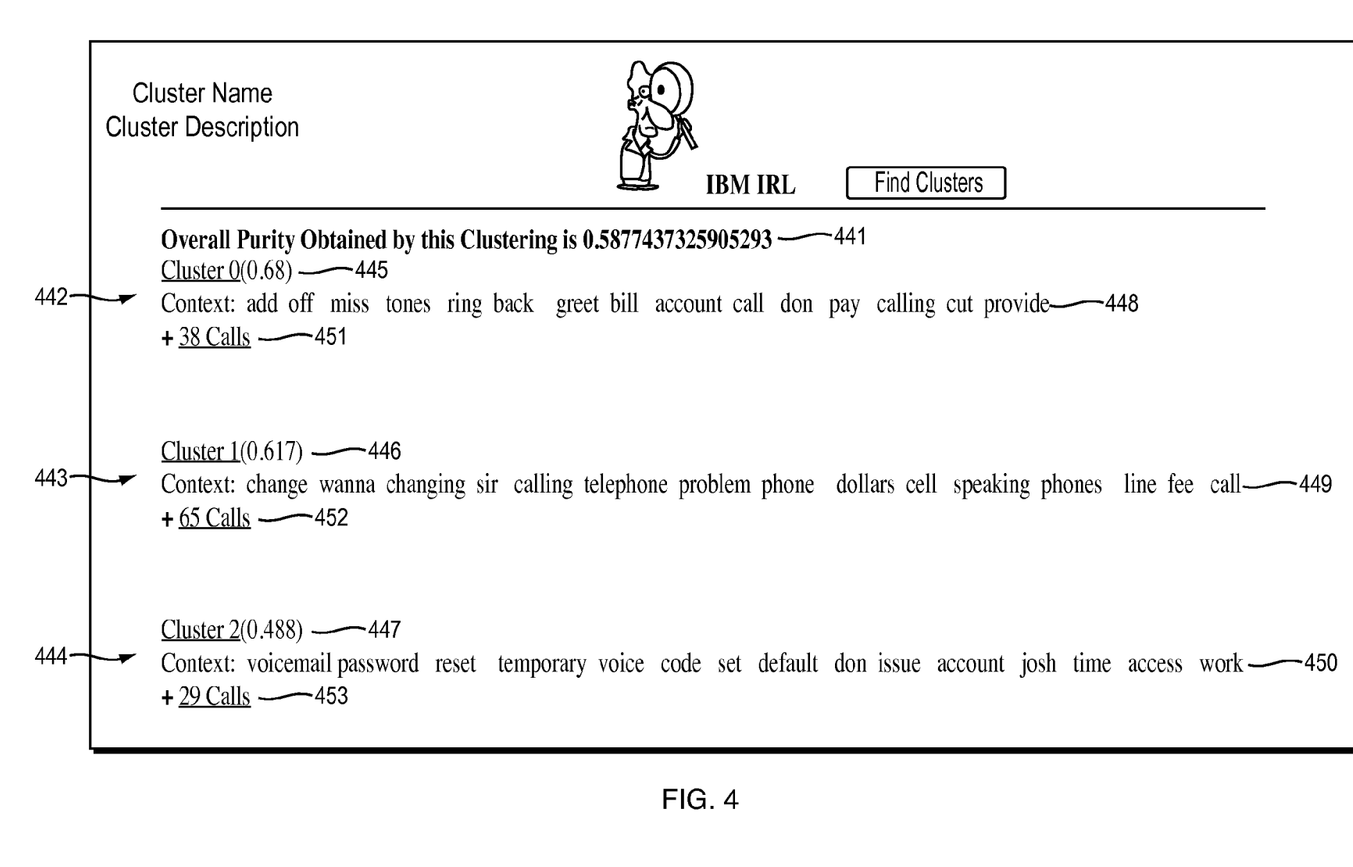

In FIG. 4, there is shown an example clustering output in accordance with an embodiment of the invention. Such an output may, for example, be produced by a feedback processor 120 based on output from clustering processor 110 for display to a user to receive feedback. The user is provided with an overall purity score 441 for the clustering, along with data for each of the clusters 442-444, which here are shown before they have been labeled. Each cluster 442-444 has an individual score 445-447 indicating the tightness of that cluster. Further, each cluster 442-444 has a corresponding context vector 448-450, indicating key words associated with each cluster. In addition, the user is provided with expansion tabs 451-453 to permit viewing of the underlying data points in each cluster.

FIG. 5 is a further example of clustering output in accordance with an embodiment of the invention. In this case, the underlying data 554-556 within a single cluster 543 has been expanded for display to a user to provide feedback. The underlying data 554-556 includes a transcription 557-559, a file name 560-562, a measure 563-565 of the data's belonging to the cluster, and an accept/reject input 566-568 for the user to choose whether each data point should be accepted or rejected from the cluster 543.

FIG. 6 is a further example of clustering output in accordance with an embodiment of the invention. In this case, a user has provided a choice 666, 667 to accept two of the data points in the cluster.

Figure 7:
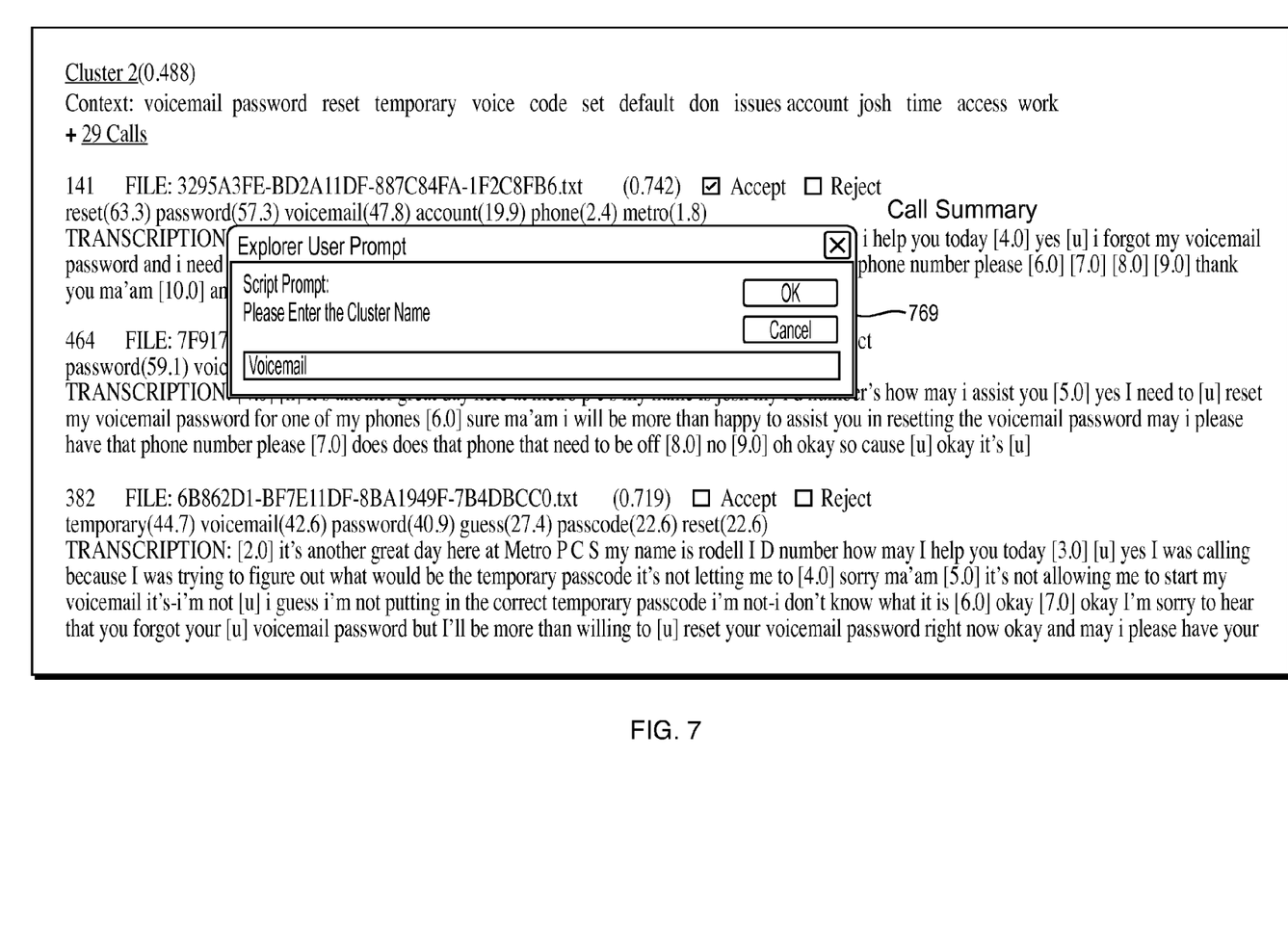

FIG. 7 is a further example of clustering output in accordance with an embodiment of the invention. In this case, a user has provided a label 769 for the cluster, based on a review and interpretation of the content of the underlying data.

FIG. 8 is an example of providing membership constraints in accordance with an embodiment of the invention. In this case, the label 870 that was provided in FIG. 7 has been applied to the cluster, and the user now provides accept/reject inputs 866, 867 which are used by the clustering processor as membership constraints in a subsequent iteration of the clustering.

Figure 9:
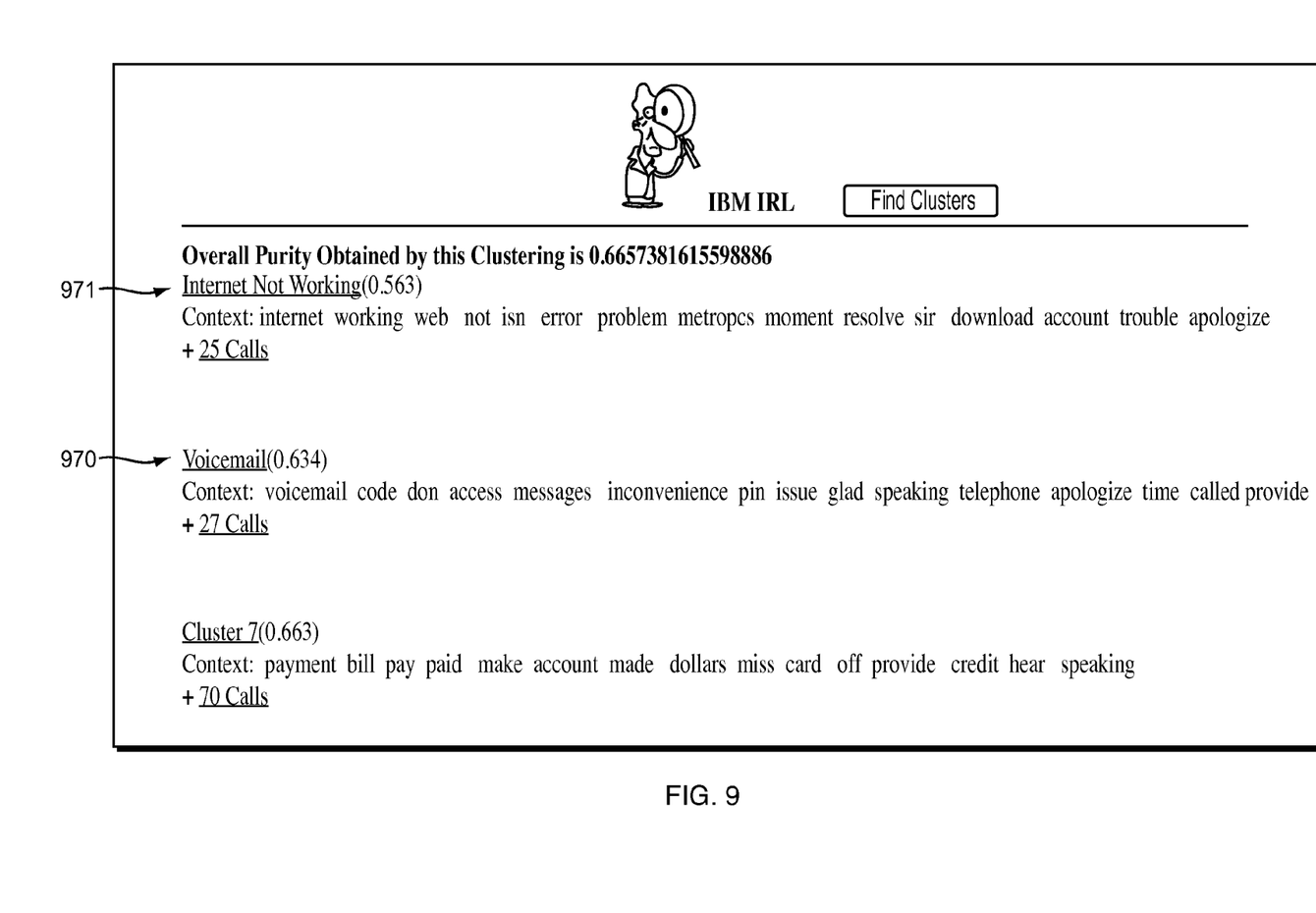

FIG. 9 is an example of output from re-generating a clustering, in accordance with an embodiment of the invention. Two labels 970, 971 from previous user feedback have been associated with two of the clusters, which have been re-grouped based on constraints determined from the user's previous feedback. In this way, the data objects, which were initially unlabeled, have been grouped and annotated in ways that are meaningful and intuitive for a user of the data objects, based on both automated machine clustering and automated incorporation into the clustering of iterative feedback from the user.

An embodiment according to the invention may make use a variety of different possible methods of clustering. For example, K-means clustering may be used, where the term K-means clustering is defined as partitioning n observations into k clusters in which each observation belongs to the cluster with the nearest mean. A user may input a number of clusters to produce using K-means clustering. For example, techniques of clustering may be used such as those found in U.S. Pat. Nos. 6,460,035, 6,654,739 and 7,779,349, the teachings of which are hereby incorporated herein by reference in their entirety. Other techniques of clustering known in the art may be used, such as expectation-maximization clustering.

It will be appreciated that, in accordance with an embodiment of the invention, a user need not provide feedback on all underlying data or indeed on all clusters.

In accordance with an embodiment of the invention, constraints may be produced, added or changed based on the user's feedback, and are used in addition to the other constraints from previous iterations, which are kept intact. Based on the clustering methods that are used, data that is similar to user-accepted data in clusters is more likely to remain in a given cluster, whereas data that is similar to data that has been rejected from a cluster by a user is more likely to be removed from that cluster. Goodness measures for clusters may be measures of the tightness of the cluster, or any other scoring measures; and may be presented to the user along with other clustering data presented for user feedback. The system may discover the "best" data for user feedback, which may be documents that are most representative of groups of data, and prompt the user for feedback on that data.

Figure 10:
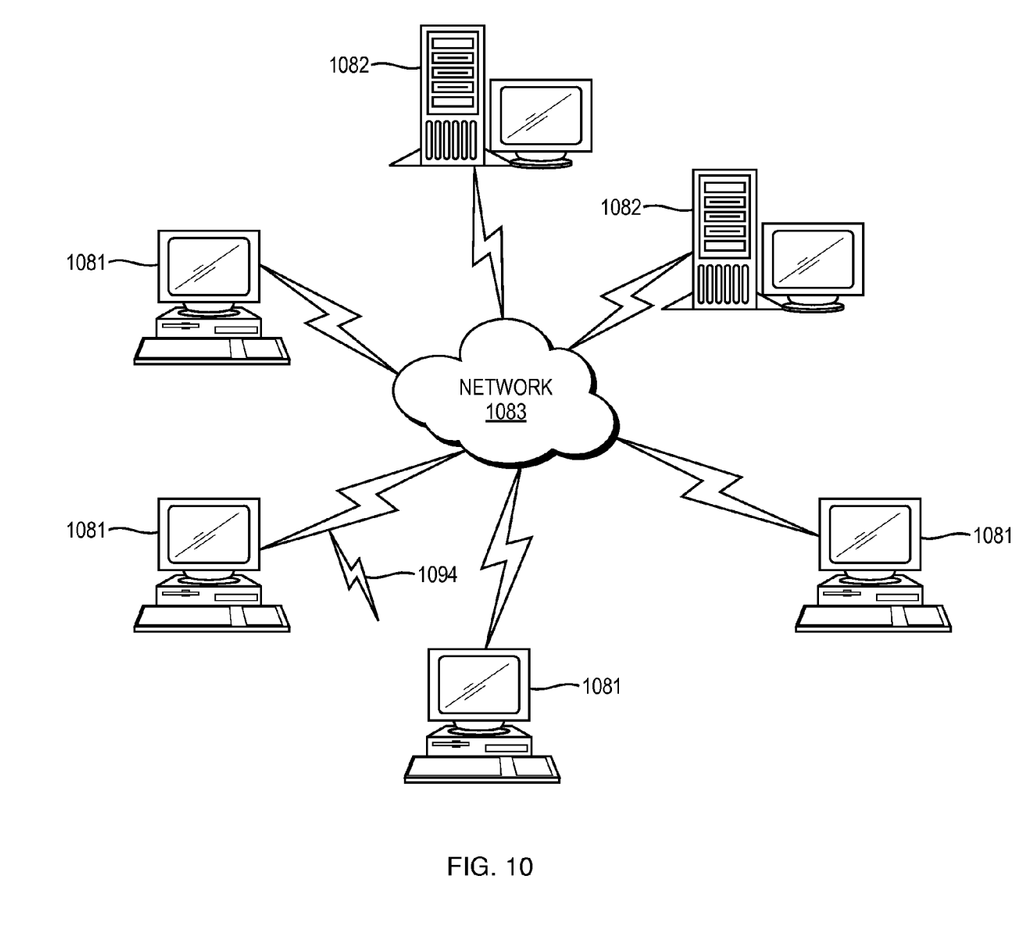
FIG. 10 illustrates a computer network or similar digital processing environment in which an embodiment of the invention may be implemented.

FIG. 10 illustrates a computer network or similar digital processing environment in which the present invention may be implemented. Client computer(s)/devices 1081 and server computer(s) 1082 provide processing, storage, and input/output devices executing application programs and the like. Client computers 1081 can include, for example, the computers of users providing feedback on clustered data in accordance with an embodiment of the invention; and server computers 1082 can include the clustering processor 110, feedback processor 120 and other systems implementing a technique for labeling unlabeled data in accordance with an embodiment of the invention. Client computer(s)/devices 1081 can also be linked through communications network 1083 to other computing devices, including other client devices/processes 1081 and server computer(s) 1082. Communications network 1083 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
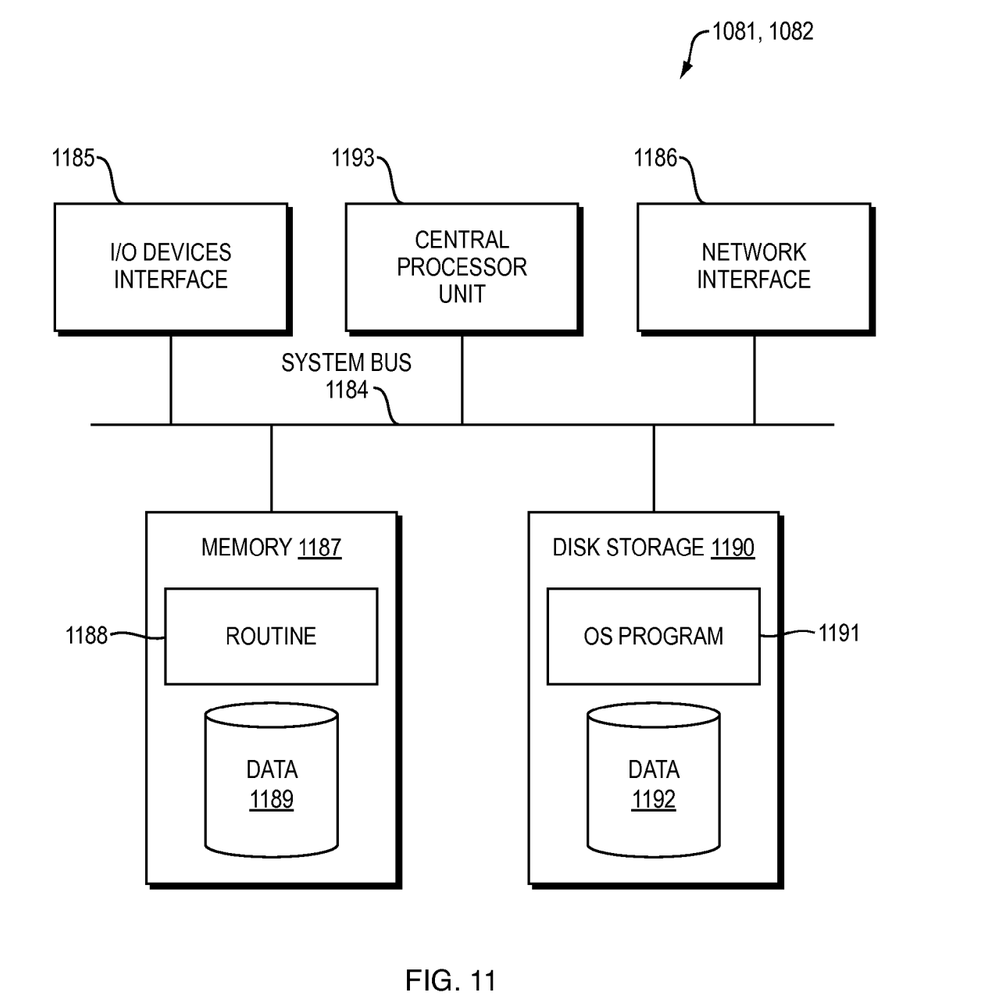
FIG. 11 is a diagram of the internal structure of a computer (such as client processor/devices or server computers) in the computer system of FIG. 10, with which an embodiment of the invention may be implemented.

FIG. 11 is a diagram of the internal structure of a computer (e.g., client processor/device 1081 or server computers 1082) in the computer system of FIG. 10. Each computer 1081, 1082 contains system bus 1184, where a bus is a set of hardware lines used for data transfer among the components of a computer or processing system. Bus 1184 is essentially a shared conduit that connects different elements of a computer system (e.g., processor, disk storage, memory, input/output ports, network ports, etc.) that enables the transfer of information between the elements. Attached to system bus 1184 is I/O device interface 1185 for connecting various input and output devices (e.g., keyboard, mouse, displays, printers, speakers, etc.) to the computer 1081, 1082. Network interface 1186 allows the computer to connect to various other devices attached to a network (e.g., network 1083 of FIG. 10). Memory 1187 provides volatile storage for computer software instructions 1188 and data 1189 used to implement an embodiment of the present invention (e.g., routines for implementing labeling of unlabeled data). Disk storage 1190 provides non-volatile storage for computer software instructions 1191 and data 1192 used to implement an embodiment of the present invention. Central processor unit 1193 is also attached to system bus 1184 and provides for the execution of computer instructions.

A system in accordance with the invention has been described in which unlabeled data is labeled. As used herein, a "clustering processor" is a portion of the system that groups data to produce at least one data group, and that re-groups the at least one data group using at least one constraint based on the feedback provided by a user. Such a clustering processor may, for example, be a portion of program code, operating on a computer processor. Further, as used herein, a "feedback processor" is a portion of the system that enables a user to provide feedback on at least one data group, for example feedback on membership of a data object in a data group and feedback on a current labeling of data group; and that applies a label to a data group of the at least one data group to produce at least one labeled data group, the label based on the feedback provided by the user after the grouping or on feedback provided by the user after at least one regrouping by the clustering processor. Such a feedback processor may, for example, be a portion of program code, operating on a computer processor.

Portions of the above-described embodiments of the present invention can be implemented using one or more computer systems, for example to permit labeling of unlabeled data. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A device for labeling unlabeled data, the device comprising:
    a memory with computer code instructions stored thereon, the memory with one or more processors, and the computer code instructions being configured to cause the device to implement:
    a clustering processor configured to group the unlabeled data to produce at least one data group;
    a feedback processor configured to:
        enable a user to provide feedback on the at least one data group, the feedback including at least one of: (i) feedback on membership of a data object in a data group, and (ii) feedback on a current labeling of a data group, and
        discover a representative set of data objects from the at least one data group on which to seek feedback from the user, the representative set of data objects comprising at least two data objects and being smaller than the at least one data group, each data object of the representative set of data objects being similar to a respective sub-group of the at least one data group, each sub-group comprising a plurality of data objects from the at least one data group;
    the clustering processor further configured to regroup the at least one data group using at least one constraint based on the feedback provided by the user; and
    the feedback processor further configured to apply a topic label to a data group of the at least one data group to produce at least one labeled data group, the topic label indicating contents of the labeled data group and the topic label based on the feedback provided by the user after the grouping or on feedback provided by the user after at least one regrouping by the clustering processor.

2. The device according to claim 1, wherein the feedback processor is further configured to enable the user to provide feedback based on the discovered representative set of data objects.

3. The device according to claim 1, wherein the clustering processor comprises a K-means clustering processor.

4. The device according to claim 1, wherein the feedback processor is further configured to receive feedback provided by the user including at least one of the following: a new name of a data group; an acceptance of membership of a data object in a data group; a rejection of membership of a data object in a data group; a splitting of a data group; a merging of a data group; an acceptance of a member of a cluster centroid of a data group; and a rejection of a member of a cluster centroid of a data group.

5. The device according to claim 1, wherein the feedback processor is further configured to display at least one data object of the at least one labeled data group to the user.

6. The device according to claim 1, wherein the clustering processor is further configured to determine, for a data group of the at least one data group: (i) at least one data object belonging to the data group; and (ii) a context vector for the data group.

7. The device according to claim 1, wherein the clustering processor is further configured to determine, for a data group of the at least one data group, a scoring measure for the data group.

8. The device according to claim 1, wherein the clustering processor is further configured to group the data based on at least one initial constraint provided by the user.

9. A method for labeling unlabeled data, the method comprising:
    grouping the unlabeled data using clustering to produce at least one data group;
    discovering a representative set of data objects from the at least one data group on which to seek feedback from the user, the representative set of data objects comprising at least two data objects and being smaller than the at least one data group, each data object of the representative set of data objects being similar to a respective sub-group of the at least one data group, each sub-group comprising a plurality of data objects from the at least one data group;
    enabling a user to provide feedback on the at least one data group, the feedback including at least one of the following: (i) feedback on membership of a data object in a data group, and (ii) feedback on a current labeling of a data group;
    regrouping the at least one data group using further clustering including at least one constraint based on the feedback provided by the user; and
    applying a topic label to a data group of the at least one data group to produce at least one labeled data group, the topic label indicating contents of the labeled data group and the topic label based on the feedback provided by the user after the grouping or on feedback provided by the user after at least one regrouping.

10. The method according to claim 9, wherein the enabling the user to provide feedback is performed based on the discovered representative set of data objects.

11. The method according to claim 9, wherein the grouping the data using clustering comprises performing K-means clustering on the data.

12. The method according to claim 9, wherein the feedback provided by the user comprises at least one of the following: a new name of a data group; an acceptance of membership of a data object in a data group; a rejection of membership of a data object in a data group; a splitting of a data group; a merging of a data group; an acceptance of a member of a cluster centroid of a data group; and a rejection of a member of a cluster centroid of a data group.

13. The method according to claim 9, further comprising displaying at least one data object of the at least one labeled data group to the user.

14. The method according to claim 9, wherein grouping the data comprises, for a data group of the at least one data group, determining: (i) at least one data object belonging to the data group; and (ii) a context vector for the data group.

15. The method according to claim 9, wherein grouping the data comprises, for a data group of the at least one data group, determining a scoring measure for the data group.

16. The method according to claim 9, wherein the grouping the data using clustering is performed based on at least one initial constraint provided by the user.

17. A non-transitory computer-readable storage medium having computer-readable code stored thereon, which, when executed by a computer processor, causes the computer processor to label unlabeled data, by causing the processor to:
    group the unlabeled data using clustering to produce at least one data group;
    discover a representative set of data objects from the at least one data group on which to seek feedback from the user, the representative set of data objects comprising at least two data objects and being smaller than the at least one data group, each data object of the representative set of data objects being similar to a respective sub-group of the at least one data group, each sub-group comprising a plurality of data objects from the at least one data group;
    enable a user to provide feedback on the at least one data group, the feedback including at least one of the following: (i) feedback on membership of a data object in a data group, and (ii) feedback on a current labeling of a data group;
    regroup the at least one data group using further clustering including at least one constraint based on the feedback provided by the user; and
    apply a topic label to a data group of the at least one data group to produce at least one labeled data group, the topic label indicating contents of the labeled data group and the topic label based on the feedback provided by the user after the grouping or on feedback provided by the user after at least one regrouping.

\* \* \* \* \*